United States Patent [19]

Blamberg

[11] Patent Number: 4,529,973

[45] Date of Patent: Jul. 16, 1985

[54] SCHOOL CAFETERIA SOUND LEVEL MONITOR

[76] Inventor: Siegmar R. Blamberg, 4 No. Cove Rd., Old Saybrook, Conn. 06475

[21] Appl. No.: 502,180

[22] Filed: Jun. 8, 1983

[51] Int. Cl.³ ............................................ G08B 21/00
[52] U.S. Cl. .................................... 340/573; 181/0.5; 307/56; 340/540; 340/566; 307/117
[58] Field of Search ...................... 340/573, 566, 540; 381/50, 57, 83; 307/117; 181/0.5

[56] References Cited

U.S. PATENT DOCUMENTS

| | | | |
|---|---|---|---|
| 3,304,368 | 2/1967 | Ford et al. | 381/57 |
| 3,875,337 | 4/1975 | Bradley | 381/56 |
| 4,346,374 | 8/1982 | Gropf | 340/573 |
| 4,424,511 | 1/1984 | Alberts, Jr. | 381/57 |

*Primary Examiner*—Glen R. Swann, III
*Attorney, Agent, or Firm*—William A. Simons

[57] ABSTRACT

Three distinct visual indications, one audible indication, and preferably one timing output voltage are provided which are individually activated depending upon when the sound levels falls within a predetermined level. This monitor aids both students and supervisors in establishing consistent and fair noise standards. Variable controls are provided to allow the supervisor to determine the sound level at which the visual indications and audible indication and timing output voltage will automatically be activated. A filter network is included that attenuates non-voice frequencies as well as short, non-repetitive sounds.

5 Claims, 4 Drawing Figures

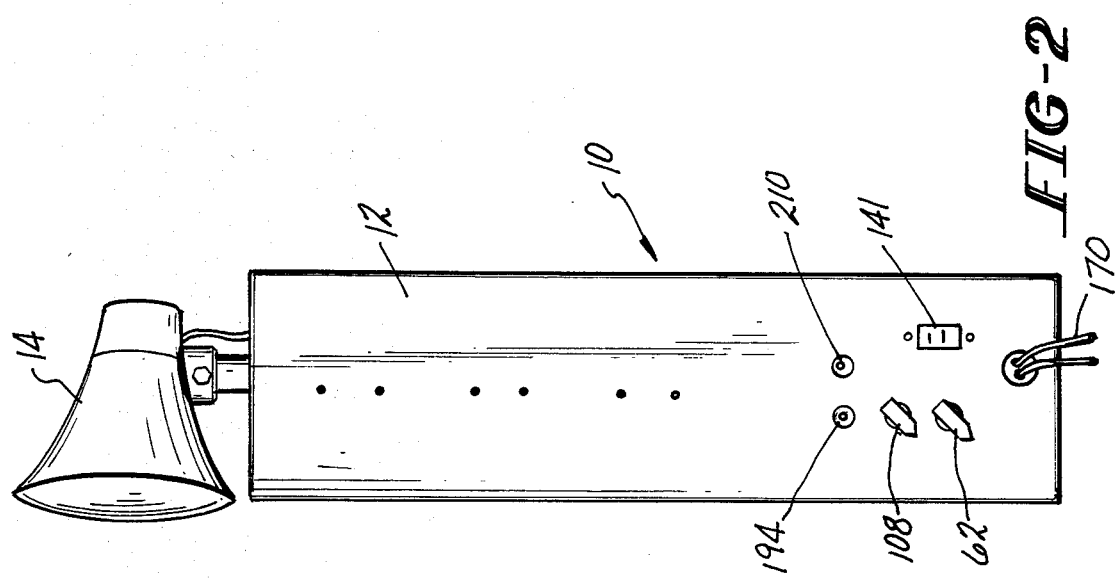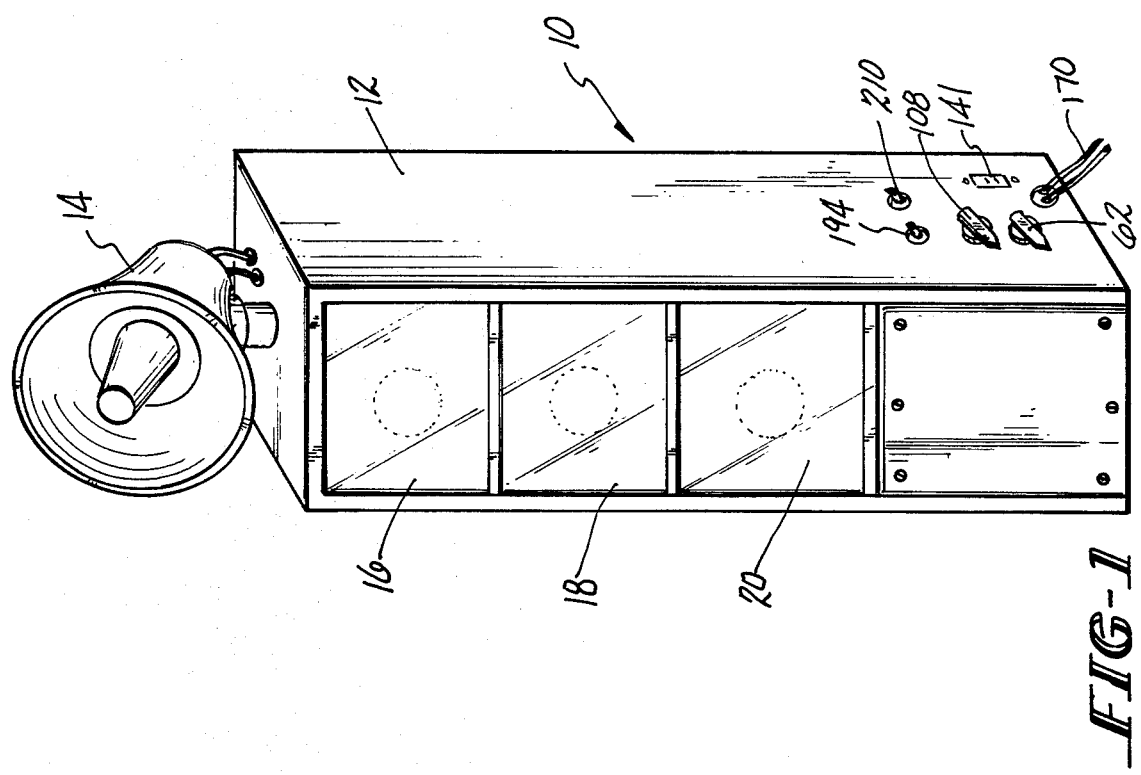

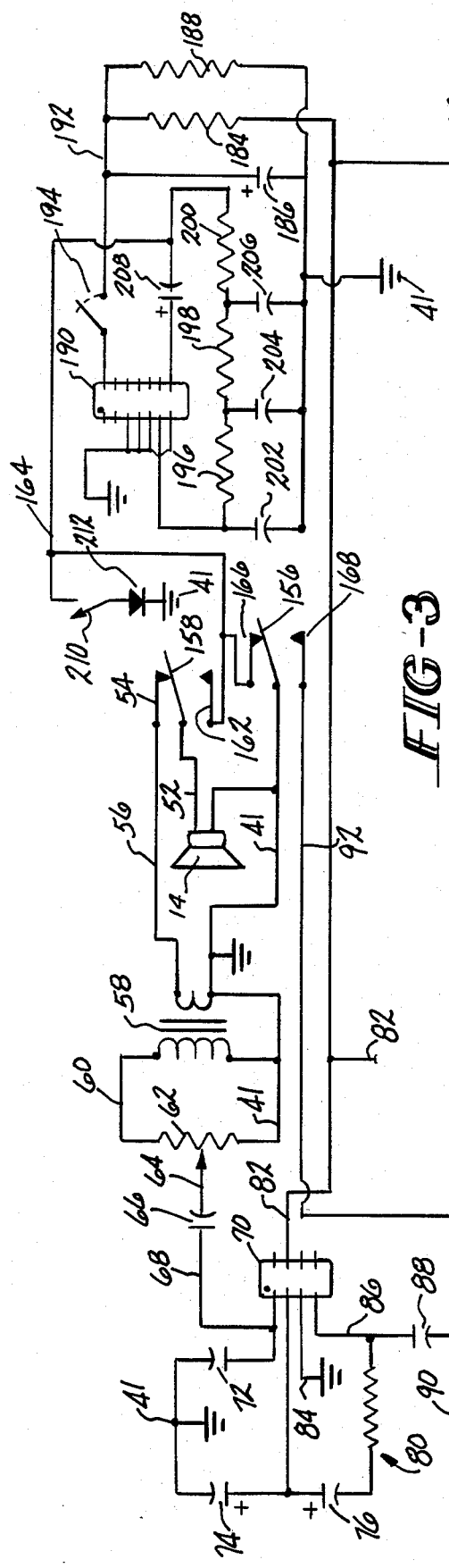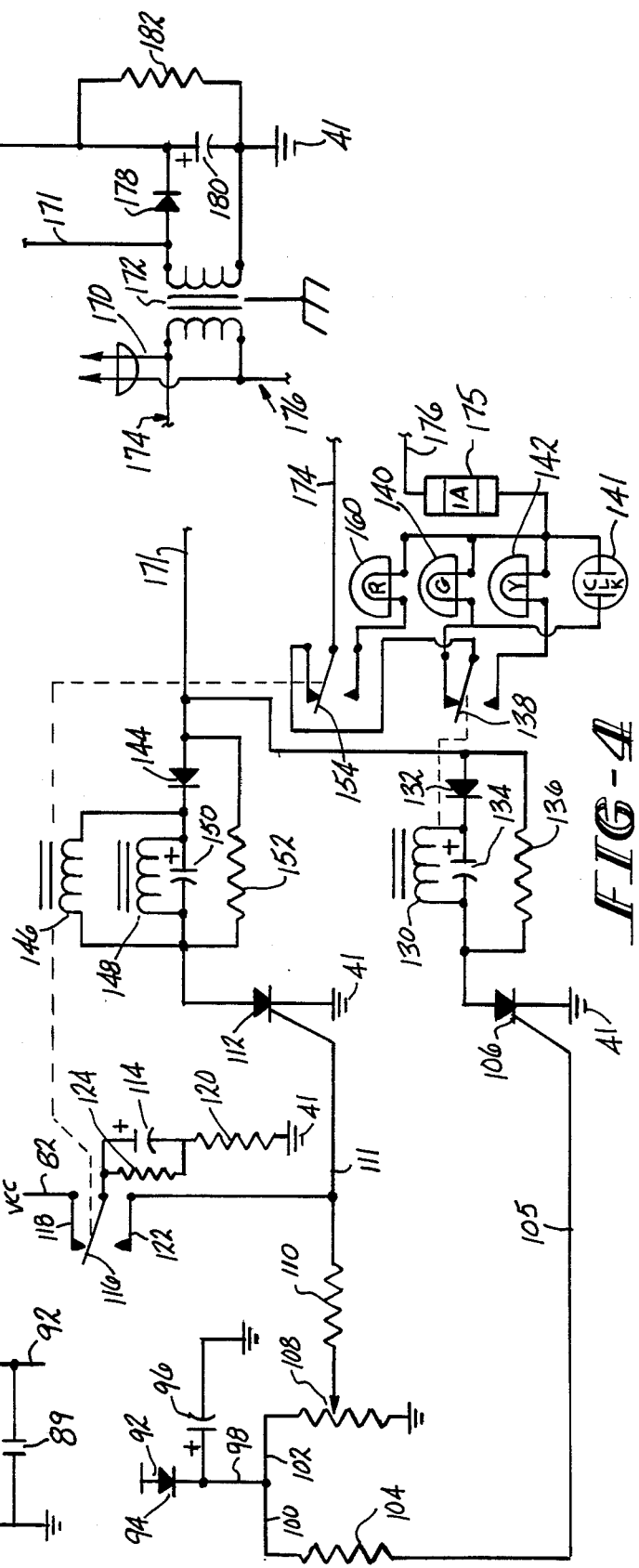
FIG-3
FIG-4

SCHOOL CAFETERIA SOUND LEVEL MONITOR

BACKGROUND OF THE INVENTION

1. Field of the Invention

The present invention relates to a sound level monitor having a sound level detection means and both visual and audio indicators of that sound level. In particular, the present invention relates to a school cafeteria sound level monitor which detects the level of sound in said cafeteria and provides three visual indications and one audio indication depending upon the level of sound.

2. Brief Description of the Prior Art

Elementary school students can get pretty loud in the school cafeteria. They should and must release their tensions and built-up energy. But when the noise levels in the cafeteria increase, tension is produced rather than relieved. There has always been a problem of supervising cafeterias. Supervisors tend to tolerate too much or too little, depending on the day. Horseplay, wasted food, and conflict are all too commonplace. Accordingly, there is a need to monitor the sound level fairly and consistently.

BRIEF SUMMARY OF THE INVENTION

This invention, therefore, is directed to a school cafeteria sound level monitor which detects the level of sound in the cafeteria and provides visual and audible indications corresponding to predetermined levels of sounds, comprising in combination:

a pick up device for detecting sound within the cafeteria;

a first-mode (or green-mode) visual indication means for providing a visual indication that the level of sound is within a predetermined range of acceptable sound level;

a second-mode (or yellow-mode) visual indication means for providing a visual indication that the level of sound is within a predetermined range above the acceptable sound level range;

a third-mode (or red-mode) visual indication means for providing a visual indication that the level of sound exceeds the predetermined range indicated by the second-mode visual indication means;

a speaker for providing an audible indication that the level of sound exceeds the predetermined range indicated by the second-mode visual indication means;

a power supply means for energizing an audio preamplifier circuit, control circuits, and a tone oscillator/amplifier circuit;

wherein the pick up device is coupled to the audio preamplifier for amplifying the sound picked up by the pick up device; the control circuits are coupled to the output of the audio preamplifier circuit and comprise:

(i) a rectifier circuit coupled to the output of the audio preamplifier circuit which converts the alternating current of the audio preamplifier circuit to a pulsating direct circuit;

(ii) a filter circuit connected to the rectifier circuit, the filter circuit to produce a direct current output and provide a load on the audio preamplifier circuit resulting in the non-registration of quick non-repeating noises which might otherwise activate the second-mode and the third-mode visual indication means and the speaker;

(iii) a first SCR (silicon controlled rectifier) having a sufficient gate voltage supplied from the direct current from the filter circuit;

(iv) a first relay energized when the first SCR conducts;

(v) a first set of relay contacts pulled in when the first relay is energized which causes the first-mode visual indication means to switch off and the second-mode visual indication means to switch on;

(vi) a second SCR having a sufficient gate voltage supplied from the direct current from the filter circuit through a variable resistance means;

(vii) second and third relays simultaneously energized when the second SCR conducts;

(viii) a second set of relay contacts pulled in when the second relay is energized which causes the second-mode visual indication means to switch off and the third-mode visual indication means to switch on;

(ix) a third set of relay contacts pulled in simultaneously with the second set of relay contacts when the second relay is energized, which causes a current to pass from a charged capacitor into the gate of the second SCR for a period of not more than 10 seconds;

and wherein a fourth set of relay contacts is pulled in when the third relay is energized, which causes activation of the tone oscillator/amplifier circuit and deactivation of the audio preamplifier circuit;

and wherein a fifth set of relay contacts is pulled in when the third relay is energized, which causes activation of the speaker and deactivation of the pick up device.

In one preferred embodiment of this invention, a provision for recording the specific amount of time the monitor is in the first (or green) mode is included. This may be accomplished by coupling the first-mode visual indication means with an electrical timing output which measures the amount of time the sound level is within the range of the first mode and employing the above-noted first set of relay contacts to switch off the timing output when the first-mode visual indication means is switched off.

BRIEF DESCRIPTION OF THE DRAWINGS

FIGS. 1 and 2 are perspective views of a school cafeteria sound level monitor of the present invention.

FIG. 3 is a schematic diagram of the power supply circuits, microphone/speaker, tone oscillator/amplifier circuits, and preamplifier circuits of the present invention.

FIG. 4 is a schematic drawing of the control circuits of the present invention.

The five sets of relay contacts in FIGS. 3 and 4 are shown when the level of sound is in the range indicated by the first-mode (or green) indication means.

DESCRIPTION OF THE PREFERRED EMBODIMENT

Referring to FIGS. 1 and 2, a school cafeteria noise monitor 10 is shown. The monitor is designed to detect and react to noise in excess of two predetermined levels which occurs within a school cafeteria. The exterior of the monitor 10 consists of a housing 12, a microphone/speaker 14 for detecting noise within the cafeteria and for sending out an audible alarm or indication when too much noise is present, three visual displays 16, 18, and 20, which indicate which level of noise is present in the cafeteria, top display 16 being red in color, middle display 18 being yellow in color, and lower display 20 being green in color; these displays being lighted from behind by a standard light bulb (e.g. 15 watt). An electrical timing output 141 is preferably provided for measuring the period of time the machine is in the green mode. A line cord 170 extends from the side of the housing, allowing the noise monitor to be plugged into any convenient wall outlet. Push-button 194 turns the alarm signal either on or off. Push-button 210 controls the amplitude of the audible alarm signal between either a high or low audible tone. Control means 62 and 108 control the levels of sound amplitude needed to transfer the visual displays from the green to yellow modes and from the yellow to red modes, respectively.

Any cafeteria noise is detected by microphone 14. When the sound level is at an acceptable level, the green visual display 20 will be lighted automatically and an electrical voltage will be present at timing outlet 141. When the noise level is slightly above the acceptable level, the yellow visual display 18 is lighted (and the green visual display light 20 and timing output 141 are turned off). This means that the students are being cautioned to lower their noise level. If the noise level of the cafeteria becomes too loud so as to be unacceptable, the red visual display 16 lights up (and the yellow visual display light 18 turns off), and the speaker 14 sounds an audible alarm for a few seconds. A teacher or other supervisory personnel may then take appropriate action. Accordingly, by this system, the same noise standards resulting in appropriate discipline are enforced at all times. The students and supervisors respond positively when everybody in every situation, is treated fairly and consistently.

Referring to FIG. 3, the cafeteria sounds are received by pick-up device 14. Preferably, this pick-up device is a microphone/speaker combination which is the same as microphone speaker 14 in FIGS. 1 and 2. The output of the pick-up device 14 flows through the wire 52 and the normally closed relay contact 54 and wire 56 into the primary side of impedance coupling device 58. This impedance coupling device is preferably an input transformer having a step-up ratio.

This small voltage is magnetically induced into the secondary of this impedance coupling device 58. This magnetically induced voltage flows through wire 60 to variable resistor 62. The pick-up device 14, the impedance coupling device 58, and variable resistor 62 are grounded by wire 41.

This variable resistor 62 controls the overall sensitivity of monitor 10 by controlling the amplitude of the noise signal being fed through wire 64 into input capacitor 66 and wire 68 into the input of an audio preamplifier integrated circuit 70. The overall gain of this integrated circuit is controlled by the bias and feedback network composed of capacitors 72, 74, and 76, and resistor 80 and is grounded by wire 41. VCC and negative DC power are provided to integrated circuit 70 through wires 82 and 84 respectively.

The activation of the second-mode (or yellow-mode) visual indication means is dependent upon the amount of the noise signal passing through this variable resistor 62. By increasing the resistance in the variable resistor 62 with reference to signal, you reduce the amount of noise signal entering wire 64 and increase the sound level of cafeteria noise needed to trigger the activation of the second-mode (or yellow-mode) visual indication means.

Output of integrated circuit 70 flows through wire 86 to output coupling capacitor 88, bypass capacitors 89, loaded by resistor 90 and then fed to control circuits through wire 92.

Now, referring to FIG. 4, the amplified AC noise signal leaving the audio preamplifier circuit by wire 92 enters on the anode side of diode 94, where this noise signal is rectified and then filtered by capacitor 96. A pure DC wave form or control voltage is thus produced on wire 98. Capacitor 96 also acts to absorb short, non-repeating voltage spikes which might otherwise activate the second-mode (yellow-mode) indication means 142 or both the third-mode (red-mode) visual indicator 160 and the audible alarm 14.

The DC control voltage appears on wires 98, 100, and 102. The DC control voltage on wire 100 is coupled to the gate of SCR 106 by resistor 104. The DC control voltage on wire 102 is adjusted by variable resistor 108 and coupled to the gate of SCR 112 by resistor 110. The variable resistor 108 establishes the lower limit of activation level of the third-mode visual indication means and the audible speaker 14.

When the DC controlling voltage appearing on wire 105 is sufficient (i.e., because of increased room noise and the setting of variable resistor 62) it fires SCR 106, thereby causing SCR 106 to conduct and thereby causing the activation of the second-mode (yellow-mode) visual indication means 142.

When the control voltage appearing on wire 102 continues to increase (i.e., because of more increased room noise) such that the voltage on the wiper arm of variable resistor 108 and coupled by resistor 110 and appearing on wire 111 is sufficient it fires SCR 112, thereby causing SCR 112 to conduct and thereby causing activation of the third-mode (red-mode) visual indication means 160 and audible alarm.

When the gate voltage on SCR 106 is sufficient to cause conduction and the AC voltage is positive on the anode side of diode 132, a current will flow from ground 41 through SCR 106, through relay coil 130, and through diode 132. This current will cause the energizing of coil 130 and cause armature 138 to be pulled in. The pulling in of this armature 138 causes the turning off of the first-mode (green-mode) indication means 140, the turning off of the electrical timing outlet 141 and the turning on of the second-mode (yellow-mode) indication means 142. Capacitor 134 is in parallel with relay coil 130 to filter the output of diode 132 and thus prevent relay armature chatter. The resistor 136 acts as a shunt to relay coil 130, diode 132, and capacitor 134. This resistor 136 provides a path for negative AC voltage appearing on the anode of diode 132 to pass to the anode of SCR 106 and thereby preventing a lock-in condition of SCR 106 when the gate voltage on wire 105 is reduced below firing level.

When the gate voltage on SCR 112 is sufficient to cause conduction and the AC voltage is positive on the anode side of diode 144, a current will flow from ground 41 through SCR 112, through relay coils 146 and 148 and through diode 144. This current will cause the energizing of relay coils 146 and 148 and cause armatures 154, 156, 158, and 116 to be pulled in. The pulling in of armature 154 turns off the second-mode (yellow-mode) visual indication means 142 and turns on the third-mode (red-mode) visual indication means 160. Capacitor 150 is in parallel with relay coils 146 and 148 to filter the output of diode 144 and thus prevent relay armature chatter. The resistor 152 acts as a shunt to relay coils 146 and 148, diode 144, and capacitor 150. This resistor 152 provides a path for negative AC voltage appearing on the anode of diode 144 to pass to the anode of SCR 112 and thereby preventing a lock-in condition of SCR 112 when the gate voltage on wire 111 is reduced below the firing level.

The positive side of capacitor 114 is connected to VCC 82 through the armature 116 and normally closed relay contact 118. The negative side of capacitor 114 is connected to ground 41 through limiting resistor 120. When SCR 112 conducts and relay coil 146 energizes, armature 116 is pulled in and makes connection with contact 122, causing capacitor 114 to discharge into wire 111. This discharge maintains a positive gate voltage on SCR 112 causing continuing conduction of SCR 112 until the capacitor voltage is below the gate firing level. The discharge time is determined both by the size of capacitor 114 and the shunt resistor 124.

When SCR 112 conducts and relay coil 148 energizes, armature 158 is pulled in and makes connection with contact 162, causing the microphone/speaker 14 to be connected through wire 52 to wire 164, which is output of the tone oscillator/amplifier circuit. This disables the pick-up or input function of the microphone/speaker 50 and activates the speaker or output function of the microphone/speaker 14. Also, when SCR 112 conducts and relay coil 148 is energized, armature 156 is pulled in and breaks with contact 166 and makes contact with contact 168. This disables the audio preamplifier circuit from working by placing a ground connection 41 to wire 92, which is the output of the audio preamplifier circuit. This also removes a ground connection 41 from wire 164, which is the output of the tone oscillator/amplifier circuit, permitting this circuit to function.

The power required is normally supplied from a conventional wall outlet (i.e., 117 volts AC). A grounded wall plug and line cord 170 is connected to the wall outlet (not shown). The AC voltage from wall outlet powers the primary side of a step-down transformer 172 and provides power through wires 174 and 176 to the visual indication means 140, 142, and 160 and timing outlet 141 (through fuse 175). One side of the secondary of step-down transformer 172 is connected to ground 41. The other side provides low voltage AC current (i.e., about 16 volts AC) to the anodes of diodes 132 and 144 through wire 171 and the anode of diode 178. The purpose of diodes 132 and 144 were discussed above. Diode 178 is part of half-wave rectifier circuit filtered by capacitor 180 and loaded by resistor 182 to produce a positive DC voltage (VCC) to wire 82.

The VCC voltage on wire 82 is reduced by resistor 184, further filtered by capacitor 186, and appropriately loaded by resistor 188 to ensure an appropriately lowered VCC voltage on wire 192 for integrated circuit 190. Application of the VCC circuit from wire 192 is controlled by switch 194. Resistors 196, 198, and 200 and capacitors 202, 204, and 206 form a feedback circuit responsible for producing the audible tone from integrated circuit 190. Coupling capacitor 208 couples the output of integrated circuit 190 to wire 164, where it can be heard over the speaker when armature 158 is pulled in and in contact with contact 162. Switch 210 allows connection of diode 212 between ground 41 and tone oscillator/amplifier on wire 164. When switch 210 is in the closed position, it will reduce the output tone volume by the passing of a portion of the audio output from wire 164 to ground 41.

In the exemplary circuit of FIGS. 3 and 4, the values of the various circuit components may be as follows:

| Component | Value |
| --- | --- |
| Input Transformer 58 | 8 ohms/500 ohms |
| Variable Resistor 62 | 1K ohms |
| Capacitor 66 | .47 microfarads |
| Integrated Circuit 70 | LM 387 |
| Capacitor 72 | 0.005 microfarads |
| Capacitor 74 | 10 microfarads |
| Capacitor 76 | 10 microfarads |
| Resistor 80 | 3.3 M ohms |
| Capacitor 88 | .2 microfarads |
| By-pass Capacitor 89 | .1 microfarads |
| Resistor 90 | 1K ohms |
| Diode 94 | 1N4001 |
| Capacitor 96 | 1000 microfarads |
| Resistor 104 | 10K ohms |
| SCR 106 | C106Y |
| Variable Resistor 108 | 1K ohms |
| Resistor 110 | 4.7K ohms |
| SCR 112 | C106Y |
| Capacitor 114 | 100 microfarads |
| Resistor 120 | 22K ohms |
| Resistor 124 | 15K ohms |
| Diodes 132 | 1N4001 |
| Capacitor 134 | 250 microfarads |
| Resistor 136 | 560 ohms |
| Capacitor 150 | 250 microfarads |
| Resistor 152 | 560 microfarads |
| Step-down Transformer 172 | 16 volts, 10VA |
| Fuse | 1 amp |
| Diode 178 | 1N4001 |
| Capacitor 180 | 470 microfarads |
| Resistor 182 | 250 ohms |
| Resistor 184 | 47 ohms |
| Capacitor 186 | 250 microfarads |
| Resistor 188 | 470 ohms |
| Integrated Circuit 190 | LM 380 |
| Resistor 196 | 2.2K ohms |
| Resistor 198 | 5.6K ohms |
| Resistor 200 | 2.2K ohms |
| Capacitors 202 | 0.1 microfarad |
| Capacitor 204 | 0.1 microfarad |
| Capacitor 206 | 0.1 microfarad |
| Diode 212 | 1N4001 |

What is claimed is:

1. A school cafeteria sound level monitor which detects the level of sound in said cafeteria and provides visual and audible indications corresponding to predetermined levels of sounds, comprising in combination:
   a pick up device for detecting sound within said cafeteria;
   a first-mode visual indication means for providing a visual indication that the level of sound is within a predetermined range of acceptable sound level;
   a second-mode visual indication means for providing a visual indication that the level of sound is within a predetermined range above said acceptable sound level range;
   a third-mode visual indication means for providing a visual indication that the level of sound exceeds the predetermined range indicated by said second-mode visual indication means;
   a speaker for providing an audible indication that the level of sound exceeds the predetermined range indicated by said second-mode visual indication means;
   a power supply means for energizing an audio preamplifier circuit, control circuits, and a tone oscillator/amplifier circuit;
   wherein said pick up device is coupled to said audio preamplifier for amplifying the sound picked up by said pick up device; said control circuits are coupled to the output of said audio preamplifier circuit and comprise:
(i) a rectifier circuit coupled to said output of said audio preamplifier circuit which converts the alternating current of said audio preamplifier circuit to a pulsating direct circuit;
(ii) a filter circuit connected to said rectifier circuit, said filter circuit to produce a direct current output and provide a load on said audio preamplifier circuit resulting in the non-registration of quick non-repeating noises which might otherwise activate said second-mode and said third-mode visual indication means and said speaker;
(iii) a first SCR having a sufficient gate voltage supplied from said direct current from said filter circuit;
(iv) a first relay energized when said first SCR conducts;
(v) a first set of relay contacts pulled in when said first relay is energized, which causes said first-mode visual indication means to switch off and said second-mode visual indication means to switch on;
(vi) a second SCR having a sufficient gate voltage supplied from said direct current from said filter circuit through a variable resistance means;
(vii) second and third relays simultaneously energized when said second SCR conducts;
(viii) a second set of relay contacts pulled in when said second relay is energized which causes the second-mode visual indication means to switch off and said third-mode visual indication means to switch on;
(ix) a third set of relay contacts pulled in simultaneously with said second set of relay contacts when said second relay is energized, which causes a current to pass from a charged capacitor into the gate of said second SCR for a period of not more than 10 seconds;

and wherein a fourth set of relay contacts is pulled in when said third relay is energized, which causes activation of the tone oscillator/ amplifier circuit and deactivation of said audio preamplifier circuit;
and wherein a fifth set of relay contacts is pulled in when said third relay is energized, which causes activation of said speaker and deactivation of said pick up device.

2. The monitor of claim 1 wherein said pick up device is the same as said speaker.

3. The monitor of claim 1 wherein said audio preamplifier comprises:
(i) an impedance coupling device connected to said pick up device;
(ii) a variable resistance means coupled to the output of said impedance means for controlling the amplitude of the noise signal generated therefrom;
(iii) an input coupling capacitor allowing the passage of a limited range of frequencies in said noise signal;
(iv) an integrated circuit with a feedback and bias network connected to said input coupling capacitor to amplify said filtered noise signal; and
(v) an output coupling capacitor, bypass capacitor, and load resistor connected to said integrated circuit to allow a portion of said amplified noise signal into said control circuits.

4. The monitor of claim 1 wherein said tone oscillator/amplifier comprises:
(i) an audible tone on/off switch; and
(ii) an audible tone level adjustment means.

5. The monitor of claim 1 wherein the specific amount of time said monitor is in the first-mode is measured by coupling said first-mode visual indication means with an electrical timing output and employing said first set of relay contacts to switch off the timing output when said first-mode visual indication means is switched off.

* * * * *